United States Patent
Le Meur et al.

(10) Patent No.: US 7,515,638 B2
(45) Date of Patent: Apr. 7, 2009

(54) DEVICE AND PROCESS FOR ESTIMATING NOISE LEVEL, NOISE REDUCTION SYSTEM AND CODING SYSTEM COMPRISING SUCH A DEVICE

(75) Inventors: Olivier Le Meur, Talensac (FR); Jean-Yves Babonneau, L'Hermitage (FR); Georges Joulaud, Liffré (FR)

(73) Assignee: Nextream France, Cergy Saint-Christophe (FR)

( * ) Notice: Subject to any disclaimer, the term of this patent is extended or adjusted under 35 U.S.C. 154(b) by 918 days.

(21) Appl. No.: 10/487,197

(22) PCT Filed: Aug. 6, 2002

(86) PCT No.: PCT/EP02/08810

§ 371 (c)(1), (2), (4) Date: Feb. 19, 2004

(87) PCT Pub. No.: WO03/019947

PCT Pub. Date: Mar. 6, 2003

(65) Prior Publication Data

US 2004/0179602 A1    Sep. 16, 2004

(30) Foreign Application Priority Data

Aug. 21, 2001   (FR) .................................. 01 10977

(51) Int. Cl. *H04N 7/12* (2006.01)
(52) U.S. Cl. .............................. 375/240.27; 375/240.29; 375/240.12; 375/240.24
(58) Field of Classification Search ............ 375/240.12, 375/240.24
See application file for complete search history.

(56) References Cited

U.S. PATENT DOCUMENTS 4,825,285 A * 4/1989 Speidel et al. ......... 375/240.12

(Continued)

FOREIGN PATENT DOCUMENTS

EP           244001        11/1987

(Continued)

OTHER PUBLICATIONS

Search report dated Nov. 22, 2002.

*Primary Examiner*—Marsha D Banks Harold
*Assistant Examiner*—Christopher Findley
(74) *Attorney, Agent, or Firm*—Robert D. Shedd; Paul P. Kiel; Guy H. Eriksen

(57)           ABSTRACT

The present invention relates to a device and a process for estimating the noise level of video images before coding. The device comprises in particular means of storage of at least one input image, a blockwise motion estimation module, designed to produce, blockwise, first quantities representative of motion-compensated image variations, on the basis of a current input image and of at least one input image stored previously in the said means of storage, means of estimation of a global noise level for each image as a function of at least certain of the said quantities representative of motion-compensated image variations, The said device comprises means of estimation of a local noise level for each block of the image as a function of second quantities representative of motion-compensated image variations and of the global noise level.

2 Claims, 2 Drawing Sheets

U.S. PATENT DOCUMENTS

| | | | | |
|---|---|---|---|---|
| 5,151,784 A | * | 9/1992 | Lavagetto et al. | 375/240.12 |
| 5,291,284 A | * | 3/1994 | Carr et al. | 375/240.12 |
| 5,294,925 A | * | 3/1994 | Akagiri | 341/50 |
| 5,568,196 A | | 10/1996 | Hamada et al. | 348/416 |
| 5,748,231 A | * | 5/1998 | Park et al. | 348/207.99 |
| 5,764,307 A | * | 6/1998 | Ozcelik et al. | 348/608 |
| 5,923,775 A | * | 7/1999 | Snyder et al. | 382/172 |
| 5,969,777 A | * | 10/1999 | Mawatari | 375/240.26 |
| 6,005,626 A | | 12/1999 | Ding | 348/416 |
| 6,115,071 A | * | 9/2000 | Hurst et al. | 375/240.12 |
| 6,307,888 B1 | * | 10/2001 | Le Clerc | 375/240.29 |
| 6,668,090 B1 | * | 12/2003 | Joshi et al. | 382/239 |
| 6,728,317 B1 | * | 4/2004 | Demos | 375/240.21 |
| 6,847,408 B1 | * | 1/2005 | Webb | 348/607 |
| 6,970,605 B1 | * | 11/2005 | Kondo et al. | 382/254 |

FOREIGN PATENT DOCUMENTS

| | | |
|---|---|---|
| EP | 649262 | 4/1995 |
| EP | 777388 | 6/1997 |

* cited by examiner

DEVICE AND PROCESS FOR ESTIMATING NOISE LEVEL, NOISE REDUCTION SYSTEM AND CODING SYSTEM COMPRISING SUCH A DEVICE

FIELD OF THE INVENTION

This application claims the benefit, under 35 U.S.C. § 365 of International Application PCT/EP02/08810, filed Aug. 6, 2002, which was published in accordance with PCT Article 21(2) on Mar. 6, 2003 in English and which claims the benefit of French patent application No. 0110977, filed Aug. 21, 2001.

The present invention pertains to a device and to a process for estimating noise level as well as to a noise reduction system and to a coding system comprising such a device.

BACKGROUND OF THE INVENTION

It relates to noise level estimation techniques applied to digital video signals. These techniques for estimating noise level are used in noise reduction techniques. Noise reduction techniques are generally applied to digital video images taking the form of a matrix of samples; each sample is composed of a luminance signal and, for a colour signal, of a chrominance signal.

The acquisiton of video image sequences is today still widely carried out in analogue form so that the images, once acquired and possibly forwarded and stored in analogue formats, exhibit an appreciable share of noise in their content. Once digitized, these images are also often subjected to storage/editing operations which, in their turn, introduce noise of a digital nature, this time. Finally, an image sequence generally undergoes a succession of transformations resulting in spatio-temporal noise of a strongly random nature.

To obtain high-performance functioning, noise reduction methods calling upon recursive filtering consider the very strong temporal correlation of the images of a video sequence. Consequently, the concepts of motion and of displacement are important in the fine-tuning of effective noise reduction.

The term <<displacement>> is understood to mean the change in position of an object in a scene, this change in position being localized and specific to this object. The term <<motion>> is understood to mean the entire set of displacements of objects in a video sequence.

Motion is conventionally detected either by simple image-to-image differencing, or by using a motion estimator.

When a motion estimator is used, the displacements are taken into account by computing image differences at distinct instants as well as by moving spatially within the frames. These displacements are represented by motion vector fields applied to pixels (pixelwise motion estimation) or to blocks (blockwise motion estimation). Motion-compensated image differences, called DFDs (Displacement Frame Differences), are thus obtained pixelwise or blockwise.

In known systems, the estimation of the noise level is done at the level of the image frames. This estimation leads to the noise being made uniform over the frame, and consequently the filtering also, this possibly giving rise to certain defects such as loss of definition over certain noise-free zones, the appearance of blur or the smoothing of certain textures (lawns for example). Such systems are for example described in French Patent Application 009684 filed on 24 Jul. 2000 in the name of the Thomson Multimédia Company.

SUMMARY OF THE INVENTION

The present invention relates to a device for estimating noise level based on local estimation of noise thus taking into account its strongly random character. The negative effects set forth hereinabove are then considerably reduced contributing to an increase in image quality.

The invention also pertains to a noise reduction system and to a coding system comprising such a device as well as to a corresponding motion-compensated recursive filtering process.

To this end, the invention concerns a device for estimating the noise level of video images before coding comprising:
  means of storage of at least one input image,
  a blockwise motion estimation module, designed to produce, blockwise, quantities representative of motion-compensated image variations, on the basis of a current input image and of at least one input image stored previously in the said means of storage,
  means of estimation of a global noise level for each image as a function of at least the said quantities representative of motion-compensated image variations,
  according to the invention this device comprises:
  means of estimation of a local noise level for each block of the image as a function of quantities representative of motion-compensated image variations and of the global noise level.

The expression << quantities representative of motion-compensated image variations>> is understood to mean quantities which gauge temporal modifications in an image sequence (preferably blockwise) by taking account of motion estimation. These quantities advantageously consist of the DFDs.

The DFDs are fairly well representative of the amount of noise contained in a video sequence. The DFDs even give an exact expression for it if the motion compensation is ideal (that is to say if the compensation is perfect, regardless of the nature of the motion and the deformations).

By taking account of the strongly random nature of the noise, the estimation of a local noise level makes it possible to decrease the filtering artefacts; the latter are the direct consequence of a uniform noise level over the frame synonymous with identical filtering over a noisy block and over a noise-free block.

Thus, the estimation of the noise level at the local level makes it possible to reduce in particular the strong loss of definition over the noise-free zones of the image, the appearance of blur and the smoothing of certain textures, for example, lawns.

By estimating the local noise level as a function of the global noise level of the frame, it is possible to situate the noise level of the current block with respect to the global noise level of the frame and thus to improve the estimation of the global noise level.

Preferably, the said quantities representative of motion-compensated image variations for determining the said global noise level are a minimum quantity and a mean quantity which are calculated by the blockwise motion estimation module.

Preferably, the said quantities representative of motion-compensated image variations for determining the said local noise level are a local quantity and a mean quantity which are calculated by the blockwise motion estimation module.

According to a preferred embodiment, the means of estimation of a local noise level are designed to determine the local noise level as a function of the difference between the mean DFD and the local DFD and as a function of the ratio of the said difference to the mean DFD.

Preferably, the local noise level is adjusted differently as a function of the comparison between the values of the said difference and at least one predetermined threshold value.

This makes it possible to adjust the noise level as a function of predetermined thresholds and thus to limit the fluctuations in the local noise level by prohibiting the local noise level from departing from a range of predefined values.

The invention also relates to a noise reduction device comprising a device for estimating noise level in accordance with the invention.

The invention also pertains to a coding system comprising a device for estimating the noise level in accordance with the invention.

It applies also to a process for estimating the noise level of video images before coding in which:

at least one current input image is stored, a blockwise motion estimation is performed so as to produce, blockwise, quantities representative of motion-compensated image variations, on the basis of a current input image and of at least one input image stored previously in the said means of storage, a global noise level is determined for each image as a function of at least the said quantities representative of motion-compensated image variations, According to the invention, a local noise level is determined for each block of the image as a function of quantities representative of motion-compensated image variations and of the global noise level.

BRIEF DESCRIPTION OF THE DRAWINGS

The invention will be better understood and illustrated by means of wholly nonlimiting, advantageous exemplary embodiments and modes of implementation, with reference to the appended figures in which.

Figure 1:
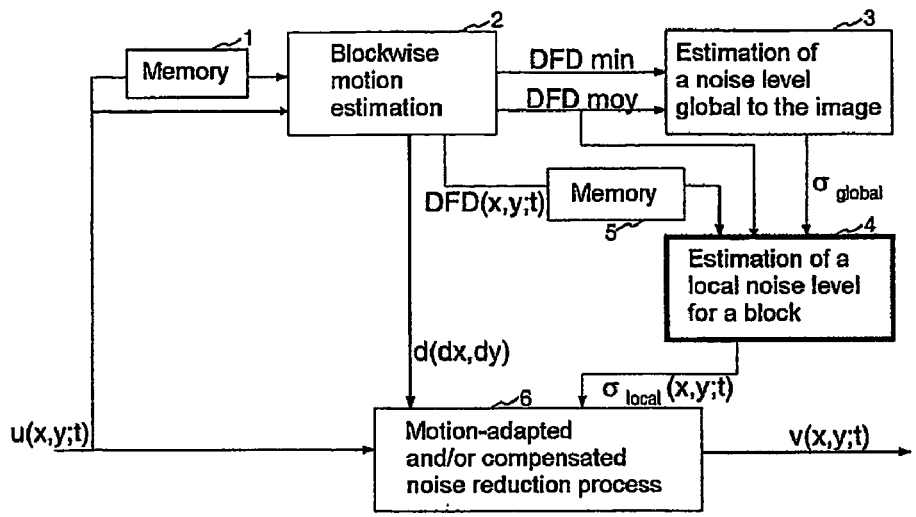
FIG. 1 represents a noise level estimation device comprising a local noise level estimation module in accordance with the invention.

The following notation is employed:

x, y and t respectively denote the abscissa, the ordinate and time, u(x,y ;t) denotes a current input signal, u(x,y;t−T) denotes an input signal retarded by a delay T (T represents a delay of one video frame for example), d(dx,dy) denotes a displacement vector, dx standing for the offset (shift) in displacement along the abscissa axis and dy the offset in displacement along the ordinate axis, v(x,y ;t) denotes the output of the filter, $\sigma_{global}$ denotes a noise level estimated for the entire image, $\sigma_{local}$ denotes a noise level estimated for a block of the image, DFD(x,y ;t): DFD(x,y ;t)=u(x,y ;t)−u(x+dx,y+dy;t−T) applied to a pixel or to a block of pixels.

DETAILED DESCRIPTION OF PREFERRED EMBODIMENT

The filtering device comprises a memory 1, designed to store an input image (signal u(x,y ;t)) and a blockwise motion estimator 2, designed to produce, blockwise, motion vectors d(dx,dy) and DFDs, on the basis of a current input image (signal u(x,y ;t)) and of an input image previously stored (signal u(x,y ;t−T)) in the memory 1.

The device is also provided with a module 3 for estimating a noise level global to the image as a function of the mean DFD ($DFD_{mean}$) and minimum DFD ($DFD_{min}$).

It also comprises a memory 5 for storing the local DFDs for the instant t. The mean DFD is calculated after having traversed all the local DFDs of the frame.

It also comprises a module 4 for estimating a local noise level for a block as a function of the noise level $\sigma_{global}$ calculated by the module 3 for estimating a noise level global to the image, of the local DFD (DFD(x,y ;t)) and of the mean DFD ($DFD_{mean}$). The functioning of this module is detailed in FIG. 2.

The mean DFD ($DFD_{mean}$) and the minimum DFD ($DFD_{min}$) are calculated previously, before calculating the local DFD (DFD(x,y ;t)).

It finally comprises a module 6 for reducing the motion-adapted and/or compensated noise level, as a function of the displacement vector d(dx,dy) and of the local noise level $\sigma_{local}$ (x,y ;t).

The module 6 outputs the current filtered image v(x,y ;t).

The module 6 can be a filtering module applied to the noise reduction or more generally an image processing module.

The minimum DFD ($DFD_{min}$) output by the blockwise motion estimation module 2 can be calculated in various ways.

According to a first embodiment, it can represent the minimum DFD of the frame. This solution is simple and inexpensive but inaccurate since it suffices for one of the DFDs to be small in order to have a small minimum DFD. This therefore gives:

$$DFD\ min = \mathrm{MIN}_{y=1,x=1}^{\frac{resY}{blockY},\frac{resX}{blockX}} [DFDlocal(x, y; t)]$$

with resX (respectively resY) the horizontal (respectively vertical) resolution, blockX (respectively blockY) the size of the horizontal block generally 16 pixels in size (respectively vertical block generally 8 pixels in size).

According to a second embodiment, the $DFD_{min}$ represents a percentage of the minimum DFDs of the frame. In this embodiment, the $DFD_{min}$ is therefore calculated on the basis of a set of values and hence does not represent a single value as in the previous embodiment. This solution is therefore more accurate but more complex since it requires that all the DFDs of the frame be ranked.

The mean DFD, $DFD_{mean}$, represents the mean of all the DFDs of the frame. The mean DFD is therefore the sum of the local DFDs over the number of DFDs in the frame. This therefore gives:

$$DFDmean = \frac{\sum_{x=1}^{\frac{resX}{blockX}} \sum_{y=1}^{\frac{resY}{blockY}} DFDlocal(x,y;t)}{\frac{resY}{blockY} \times \frac{resX}{blockX}}$$

By way of illustrative example, for a frame with resolution 720*288 and blocks of 16*8, there are (720/16)*(288/8) DFDs i.e. 1620 DFDs. In this case, the mean is computed over these 1620 DFDs and is assigned to the mean DFD.

This module receives as input the local DFD of the block being processed DFD(x,y ;t), the mean DFD $DFD_{mean}$ as well as the global noise level $\sigma_{global}$.

This module carries out a local adaptation of the noise level as a function of the mean DFD $DFD_{mean}$ and of the local DFD DFD(x,y ;t) of the current block. This adaptation is controlled on the one hand by the difference (ERROR_DFD) between the mean DFD and the local DFD and on the other hand by the ratio (Ratio_DFD) of this difference to the mean DFD.

The difference between the mean DFD and the local DFD determines the direction of variation of the adaptation; specifically, when the error is positive (signifying that the local DFD is less than the mean DFD) the noise level must be decreased. Conversely, when the error is negative, it brings. about an increase in the noise level.

The ratio of the difference between the mean DFD and the local DFD to the mean DFD marks, in a form normalized with respect to the mean DFD, the error incurred.

So as not to make a binary correction which would create visible artifacts on the image, one solution is to make a correction as a function of the thresholds. The range of variation of the error ERROR_DFD is therefore partitioned into several zones.

Figure 3:
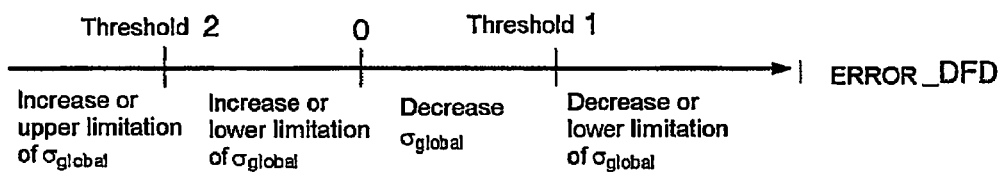
FIG. 3 represents a diagram showing the modifications made to the global noise level to obtain the local noise level as a function of predetermined thresholds.

The example, given by way of illustration hereinbelow, defines two thresholds partitioning this range into four zones, as is represented in FIG. 3.

- When the error lies between 0 and Threshold 1 (S1), the local DFD is less than the mean DFD. The noise level must therefore be decreased; for an error close to 0, the decrease is small and for an error close to Threshold 1 the decrease is a maximum over this interval, as is indicated during step E9 of FIG. 2.
- When the error lies between 0 and Threshold2 (S2), the local DFD is greater than the mean DFD. The noise level must therefore be increased; for an error close to 0, the increase is small and for an error close to Threshold2 (S2) the increase is a maximum over this interval, as is indicated during step E4 of FIG. 2.
- When the error is greater than Threshold1 (S1), the decrease in the noise level is limited to a maximum value as a function of parameters, as is indicated during step E10 of FIG. 2.
- When the error is less than Threshold2 (S2), the local DFD is greater than the mean DFD, the local noise level must therefore be increased. To carry out the local adaptation of the noise level, two cases are considered:
  - In the presence of considerable motion, the assumption is made that the motion estimator has performed a poor compensaton. The local DFD therefore represents a mixture of noise and of useful signal. The local increase in the noise level is then limited by a maximum value as is indicated during step E6 of FIG. 2.
  - In the converse case, that is to say in the presence of slight motion, the motion estimator is regarded as very reliable. The motion compensation is deemed to be of good quality. Consequently, the local DFD represents noise. The increase in the local noise level is therefore not limited as is indicated during step E7 of FIG. 2.

Weighting coefficients $\beta_1$ and $\beta_2$ allow greater or lesser accentuation of the effect of the local adjustment. Various ways of effecting this weighting are possible and the exemplary embodiment proposed is given merely by way of illustration.

Figure 2:
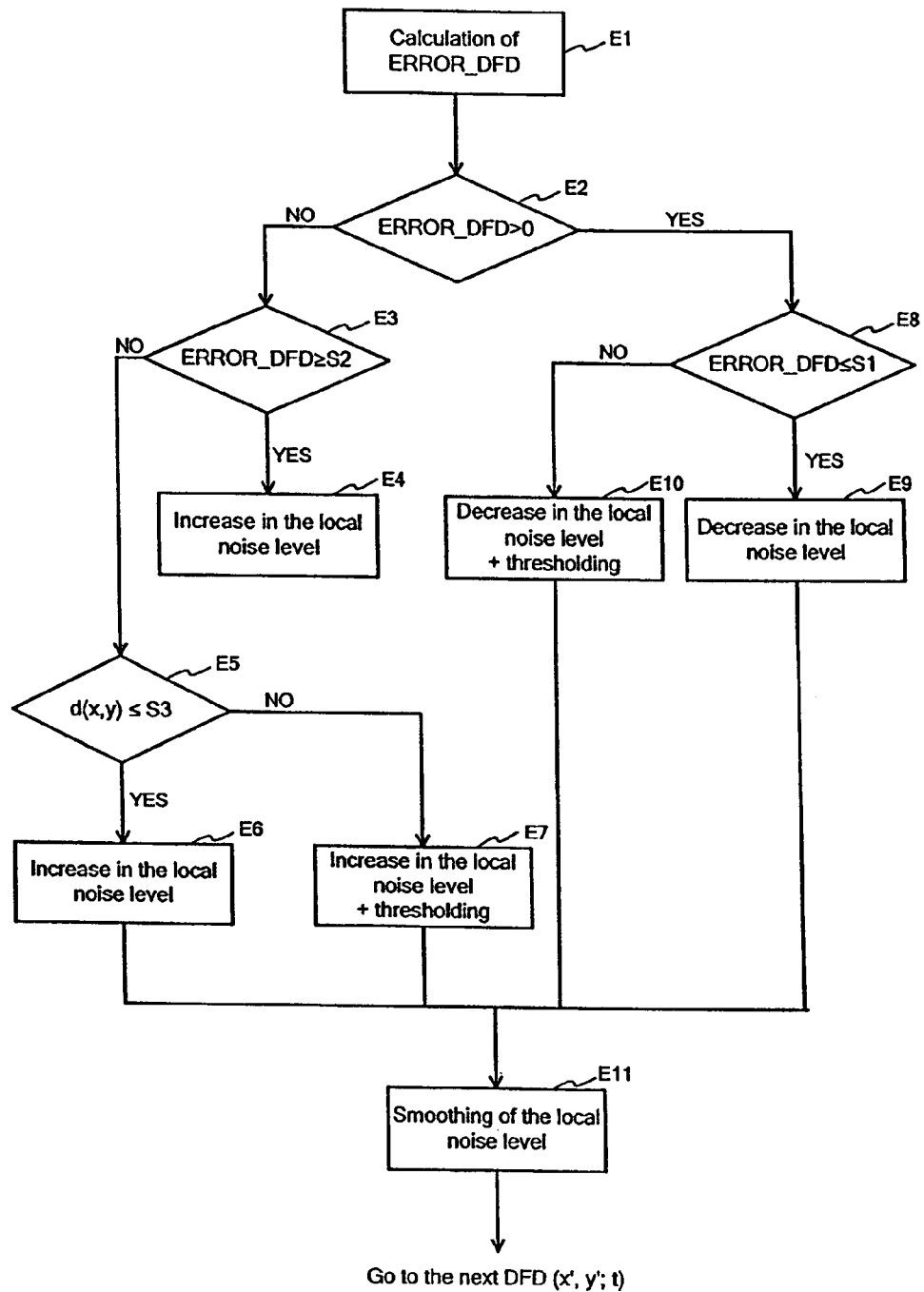
FIG. 2 shows a flow chart of the functioning of the module for estimating a local noise level for a block.

We shall now describe FIG. 2 describing an embodiment of the module 4 for estimating a local noise level for a block.

The module 4 receives as input the mean DFD $DFD_{mean}$ and the local DFD (DFD(x,y ;t)) and calculates during step E1 the difference between the mean DFD and the local DFD called ERROR_DFD.

In the course of step E2, it performs a comparison test to determine whether this difference is positive or negative.

If this difference is negative, it goes to step E3 of comparing this difference with the threshold S2.

If ERROR_DFD is greater than or equal to the threshold S2, then it goes to step E4. In the course of step E4, the local noise level is increased. By way of illustration, the increase can be performed using the following formula:

$$\sigma_{local} = \sigma_{global} - \text{Ratio\_DFD} \times \beta_2$$

If ERROR_DFD is less than S2, then it goes to step E5. In the course of step E5, it performs a test and compares the value of the displacement vector d(x,y) with a motion threshold S3. If d(x,y) is greater than S3, then it goes to step E7. In the course of step E7, the local noise level is increased and thresheld. By way of illustration, this can be done in the following manner:

$$\sigma_{local} = \sigma_{global} + \beta_2/2$$

If d(x,y) is less than or equal to S3, then it goes to step E6 in the course of which the local noise level is increased. By way of illustration, this may be done as follows:

$$\sigma_{local} = \sigma_{global} - \text{Ratio\_DFD} \times \beta_2$$

If, in the course of step E2, ERROR_DFD is positive, then it goes to step E8 of comparing this difference with the threshold S1.

If ERROR_DFD is less than or eqaul to the threshold S1, then it goes to step E9. In the course of step E9, the local noise level is decreased. By way of illustration, the decrease can be performed using the following formula:

$$\sigma_{local} = \sigma_{global} - \text{Ratio\_DFD} \times \beta_1$$

If ERROR_DFD is greater than the threshold S1, then it goes to step E10. In the course of step E10 the local noise level is decreased and a thresholding performed according to the following formula given by way of illustration:

$$\sigma_{local} = \sigma_{global} - \beta_1/2$$

Next it goes to step E11 in the course of which the value of the local noise level is smoothed by imposing a minimum value $\alpha_{min}$ and a maximum value $\alpha_{max}$. The final value of the noise level which is obtained is either the value obtained during steps E4, E6, E7, E9 or E10 or $\alpha_{max}$ if this value is greater than $\alpha_{max}$ or $\alpha_{min}$ if this value is less than $\alpha_{min}$.

In certain particular embodiments, by way of illustration, the following values may be taken for the various thresholds.

To reveal a symmetry, it will be possible to take S1=|S2| and $\beta_2 = \beta_1$.

$$S1 = 0.5 \times DFD\_mean,$$

$S2 = -0.5 \times DFD\_mean$, $\beta_2 = \beta_1 = 6$, (these coefficients are akin to $\beta$)

$S3 = 20$.

$\alpha_{min} = 3.5$ $\alpha_{max} = 15.5$

The invention claimed is:

1. A process for estimating the noise level of video images before coding in which:

at least one current input image is stored;

a blockwise motion estimation is performed so as to produce, blockwise, quantities representative of motion-compensated image variations, on the basis of a current input image and of at least one input image stored previously; and a global noise level is determined for each image as a function of at least certain of the quantities representative of motion-compensated image variations, called first quantities, wherein a local noise level is determined for each block of the image as a function of the difference between a mean displaced frame difference and a local displaced frame difference, both calculated during blockwise motion estimation, and as a function of the ratio of said difference to the mean displaced frame difference, wherein the local noise level is determined:

by decreasing the value of said global noise level, if said difference is positive, and, by increasing the value of said global noise level, if said difference is negative; and wherein, if said difference is positive, the local noise level is determined by:

subtracting from said global noise level the product of said ratio and a first predefined parameter if said difference is below a first predefined threshold, and subtracting from said global noise level half the value of said first predefined parameter otherwise.

2. A process for estimating the noise level of video images before coding in which:

at least one current input image is stored;

a blockwise motion estimation is performed so as to produce, blockwise, quantities representative of motion-compensated image variations, on the basis of a current input image and of at least one input image stored previously; and a global noise level is determined for each image as a function of at least certain of the quantities representative of motion-compensated image variations, called first quantities, wherein a local noise level is determined for each block of the image as a function of the difference between a mean displaced frame difference and a local displaced frame difference, both calculated during blockwise motion estimation, and as a function of the ratio of said difference to the mean displaced frame difference, wherein the local noise level is determined:

by decreasing the value of said global noise level, if said difference is positive, and, by increasing the value of said global noise level, if said difference is negative; and wherein, if said difference is negative, the local noise level is determined by:

adding to said global noise level half the value of a second predefined parameter if said difference is below a second predefined threshold and if the displacement vector is above a third predefined threshold, and subtracting from said global noise level the product of said ratio and said second predefined parameter otherwise.

* * * * *